(12) United States Patent
Stewart et al.

(10) Patent No.: US 11,862,826 B2
(45) Date of Patent: Jan. 2, 2024

(54) METHOD FOR DETERMINING THE COMPRESSIVE TENSILE FORCE ACTING ON A FUEL CELL STACK

(71) Applicants: AUDI AG, Ingolstadt (DE); VOLKSWAGEN AG, Wolfsburg (DE)

(72) Inventors: Ian Stewart, Burnaby (CA); Tegan Harrower, Burnaby (CA); Matej Kusy, Burnaby (CA)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 882 days.

(21) Appl. No.: 16/644,631

(22) PCT Filed: Jun. 20, 2018

(86) PCT No.: PCT/EP2018/066354
§ 371 (c)(1),
(2) Date: Aug. 13, 2020

(87) PCT Pub. No.: WO2019/048100
PCT Pub. Date: Mar. 14, 2019

(65) Prior Publication Data
US 2021/0184234 A1 Jun. 17, 2021

(30) Foreign Application Priority Data
Sep. 5, 2017 (DE) .................. 10 2017 215 510.8

(51) Int. Cl.
*G01L 5/00* (2006.01)
*H01M 8/04313* (2016.01)
*G01L 5/04* (2006.01)
*H01M 8/248* (2016.01)

(52) U.S. Cl.
CPC ......... *H01M 8/04313* (2013.01); *G01L 5/042* (2013.01); *H01M 8/248* (2013.01); *H01M 2220/20* (2013.01)

(58) Field of Classification Search
CPC ......... H01M 8/04313; H01M 2220/20; H01M 8/248; G01L 5/042
See application file for complete search history.

(56) References Cited

U.S. PATENT DOCUMENTS

2014/0255817 A1* 9/2014 Blanchet ............. H01M 8/2475
429/535

FOREIGN PATENT DOCUMENTS

| DE | 10 2013 021 468 A1 | 6/2014 |
|---|---|---|
| DE | 103 92 581 B4 | 7/2014 |
| EP | 1 870 952 A2 | 12/2007 |
| JP | 2010-157364 A | 7/2010 |

* cited by examiner

*Primary Examiner* — Jamel E Williams
(74) *Attorney, Agent, or Firm* — SEED INTELLECTUAL PROPERTY LAW GROUP LLP

(57) ABSTRACT

The present invention relates to a method for determining the compressive tensile force acting on a fuel cell stack due to at least one tensioning element. Thereby, the compressive tensile force is the overall tensile force compressing the fuel cell stack. This is determined according to the invention by means of acoustic measurements on vibratable sections of the tensioning elements. The subject matter of the invention also includes a data processing program for carrying out the method according to the invention along with the use of a smartphone for carrying out the method according to the invention.

10 Claims, 3 Drawing Sheets

METHOD FOR DETERMINING THE COMPRESSIVE TENSILE FORCE ACTING ON A FUEL CELL STACK

BACKGROUND

Technical Field

Embodiments of the invention relate to a method for determining the compressive tensile force acting on a fuel cell stack, in particular the compressive tensile force acting on the fuel cell stack due to at least one tensioning element. Furthermore, embodiments of the invention relate to a data processing device, such as a smartphone, for determining a compressive tensile force acting on a fuel cell stack along with a computer program for determining a compressive tensile force acting on a fuel cell stack on the basis of acoustic signals.

Description of the Related Art

Fuel cells use the chemical conversion of a fuel with oxygen to water to generate electrical energy. For this purpose, fuel cells have as their core components a membrane electrode assembly (MEA) with a membrane electrode unit. The latter is formed by a proton-conducting membrane, PEM, on which catalytic electrodes are arranged on both sides. Thereby, the membrane separates the anode chamber assigned to the anode and the cathode chamber assigned to the cathode from each other and electrically isolates them. It is also possible to arrange gas diffusion layers on the sides of the electrodes that do not face toward the membrane.

During operation of the fuel cell, a fuel containing hydrogen is fed to the anode, on which an electrochemical oxidation of $H_2$ to $H^+$ takes place, releasing electrons. Via the electrolytic membrane, a water-bound or water-free transport of the protons $H^+$ from the anode chamber into the cathode chamber takes place. The electrons provided at the anode are guided to the cathode via an electrical line. The cathode is supplied with an oxygen-containing operating medium, such that a reduction of $O_2$ to $O_2^-$ takes place there while absorbing the electrons. Such oxygen anions react in the cathode chamber with the protons transported across the membrane to form water.

As a rule, a fuel cell stack is formed by a large number of MEAs arranged in a stack one above the other in the stacking direction, the electrical outputs of which add up. Bipolar plates are typically arranged between the membrane-electrode assemblies, which ensure a supply of the individual MEAs with the reactants and a coolant and also act as an electrically conductive contact to the membrane-electrode assemblies.

Seals are arranged between the membrane electrode units and the bipolar plates, which seal the anode and cathode chambers to the outside and prevent operating media from escaping from the fuel cell stack. Such seals are provided on the membrane electrode assemblies, the bipolar plates or such two components. To permanently seal the stack and to ensure electrical contact between bipolar plates and membrane-electrode assemblies, the fuel cell stack is compressed prior to commissioning. Furthermore, tension elements are used to press the fuel cell stack even during operation. This is intended to counteract, for example, the operationally induced height change of the active areas of MEAs and to ensure safe operation.

Various forms of tension elements are known from the prior art. For example, two end plates arranged at the ends of the fuel cell stack can be connected by means of tension elements. The fuel cell stack is compressed by introducing tensile forces via the tension elements into the end plates. Threaded rods, tie rods, chains or the like can be used as tension elements. The use of tensioned strip or band-shaped elastic tensioning elements is also known; these are either connected to the end flaps or at least partially surround the stack in at least one cross-section (in the direction of the stack).

With regard to the design and fastening options of such elastic tensioning elements, reference is made, for example, to EP 1 870 952 A2, the contents of which are hereby referred to in full. In contrast to the disclosure of EP 1 870 952 A2, it is sufficient herein for an elastic tensioning element (tensile element) to be applied to the edge of each of the end plates of a fuel cell stack.

For operational reasons, the height of the active areas of the MEAs can change during operation of the fuel cell stack. Furthermore, the operating pressure of the operating media can counteract compression of the fuel cell stack. Particularly in the case of elastic tensioning elements, the elasticity of which can decrease over time, the stack compression should therefore be checked regularly.

Methods are already known from the prior art to quantitatively determine the compression of a fuel cell stack.

According to US 2014/0255817 A1, a fuel cell stack is compressed with a predetermined force and a corresponding change in stack height is detected. During ongoing operation, the current compression of the fuel cell stack is then to be deduced from a measured stack height.

According to JP2010-157364 A, a fuel cell stack is initially compressed by tensioning elements with an integrated tensile force measuring device and the compression corresponding to a predetermined tensile force is determined. Subsequently, the stack is clamped with ordinary tensioning elements without integrated tensile force measuring device until the predetermined compression is reached in order to adjust the defined tensile force.

According to DE 103 92 581 B4, the change in height of a fuel cell stack associated with a predetermined pressure load is determined. For static compression of the fuel cell stack, spacer plates corresponding to such change in height are then inserted between a fixed end plate and the fuel cell stack.

With the aforementioned methods, a change in stack height is always monitored. As a rule, this requires the fuel cell stack to be removed, for example, from a housing. In addition, local changes in compression are not detectable, or are only poorly detectable. The integration of pressure sensors in a fuel cell stack itself is also known. However, this requires an adaptation of internal interfaces of the fuel cell stack. In addition, if the sensors are defective, the entire fuel cell stack must be removed and disassembled.

BRIEF SUMMARY

Embodiments of the invention are now based on the object of overcoming the disadvantages of the prior art and providing a method for determining a compressive tensile force acting on a fuel cell stack, which can be carried out during operation of the fuel cell stack in an uncomplicated and cost-effective manner.

This object is achieved by a method for determining the compressive tensile force acting on a fuel cell stack due to at least one tensioning element. Thereby, the fuel cell stack has a plurality of fuel cells arranged between two end plates in the stacking direction and at least one tensioning element clamped between the end plates in the stacking direction. The tensioning element may be an elastic tensioning element known from the prior art, which is fastened to the end plates of the fuel cell stack or substantially completely surrounds the fuel cell stack in at least one cross-section along the stack direction. With regard to the design of at least one tensioning element, reference is also made to the contents of EP 1 870 952 A2.

A method includes:
(a) Exciting a vibration of a vibratable section of the at least one tensioning element;
(b) Detecting an acoustic signal emitted from the vibratable section of the at least one tensioning element;
(c) Determining a fundamental frequency of the detected acoustic signal; and
(d) Determining a tensile force acting on the vibratable section of the at least one tensioning element on the basis of the determined fundamental frequency, the length of the vibratable section and the linear mass distribution of the at least one tensioning element.

It is known that a string that is deflected from its resting position returns to its resting position in the form of a damped longitudinal and transverse vibration. The techniques described herein are based on the finding that a tensioning element used to compress a fuel cell stack is subject to substantially the same physical and acoustic principles as a string of this type.

In a method, therefore, a vibratable section of the at least one tensioning element is initially excited to vibrate. The vibration can be excited manually or by means of a suitable aid, if necessary also automatically. Thereby, a vibratable section designates a section of the tensioning element that is not fixed to the stack and is at a sufficient distance from the stack, wherein the distance at least corresponds to a maximum transverse amplitude of vibration of the vibrating vibratable section.

If the tensioning element is fixed to one side surface of each of a first and second end plate by means of tensioning devices, for example, suspension hooks, as a rule, the vibratable section is located between the tensioning devices. Alternatively, the tensioning element is fixed to a surface of a first and second end plate facing outwards in the stacking direction, and runs along this surface over a corner and a side surface of the end plate to the opposite end plate. In this case, as a rule, the vibratable section of the tensioning element extends from an inner edge of the first end plate in the stacking direction to the opposite inner edge of the second end plate. Physically, the tensioning devices or the inner edges represent fixed ends that limit the vibratable section.

In a method, an acoustic signal that is emitted by the vibrating vibratable section is then detected. For this purpose, a sound transducer, such as a microphone, may be used. The acoustic signal may be detected after a transient process of the vibratable section, that is, in a period of time in which a signal that is substantially constant in time is present. As with a vibrating string, with the vibrating vibratable section, its transverse vibration is substantially responsible for a perceptible or measurable acoustic signal.

The sound transducer or an electronic evaluation unit connected to it may enable a representation of the measured sound pressure or the measured sound intensity of the acoustic signal, depending on the frequency of the detected sound signal. A Fourier transform, for example FFT, or a wavelet transform may be used for this purpose.

In a next step of the method, a fundamental frequency of the detected acoustic signal is determined. The frequency spectrum determined from the detected acoustic signal may be used for this purpose. This may be assumed to be a superposition of a large number of periodic vibrations. This assumption can already be the basis for the determination of the frequency spectrum. The fundamental frequency is thus the smallest common divisor of the frequencies contained in the detected signal or the lowest frequency in the frequency line spectrum. In reality, the detected acoustic signal will contain, in addition to a harmonic frequency mixture, aperiodic components and disturbances and will also change over time. As a rule, a continuous signal in the frequency spectrum is therefore detected. As the fundamental frequency, the frequency of the lowest frequency band, the amplitude of which exceeds a predetermined threshold, may be determined. Methods for frequency analysis of acoustic signals, in particular for determining fundamental frequencies, are sufficiently known.

As with a vibrating string, the following natural frequencies $f_n$ result for the transverse vibration of the vibratable section of the at least one tension element, which is firmly clamped on both sides:

$$f_n = \frac{n}{2L}\sqrt{\frac{F_{Zug}}{\mu}}$$

Thereby, n designates the order of the harmonic frequency (fundamental frequency at n=1), L designates the length of the vibratable section of the at least one tensioning element, $F_{zug}$ designates the tensile force acting on the vibratable section in [N] and $\mu$ the linear mass distribution in [kg/m] of the vibratable section. The value for $\mu$ is in a first approximation, constant for the entire tensioning element. The linear mass distribution $\mu$ of the at least one tensioning element may be determined as the product of the density of the at least one tensioning element in [kg/m$^3$] and the cross-sectional area of the at least one tensioning element in [m$^2$].

Thus, on the basis of the above formula, the tensile force acting on the vibratable section can be determined with n=1 using the determined fundamental frequency of the detected acoustic signal and characteristics of the tensioning element or its vibratable section. Thus, the tensile force acting on the at least one tensioning element can also be determined cumulatively by means of the method described herein. In the equilibrium of forces, the tensile force acting on the at least one tensioning element corresponds to the tensile force compressing the stack. Thus, the compressive tensile force for the fuel cell stack can be determined with the method described herein.

Thus, the method described herein provides a simple method for in situ measurement of the tension of the tensioning elements along with the compressive tensile force acting on the entire stack. The method can be carried out in just a few minutes and is therefore extremely rapid. In addition, programs for recording an acoustic frequency spectrum and determining a fundamental frequency are already available as low-cost applications for smartphones. The method is therefore also extremely inexpensive. Thus, the method offers enormous advantages, particularly in quality control during the manufacture of fuel cell stacks, in which it enables rapid post-process control of the compression of the fuel cell stack. Thereby, with the method, varying compressions can even be controlled along a stack axis, for example, by varying the tightening of the tensioning elements.

In one embodiment, a vibratable section of the at least one tensioning element extends from a first end plate to an opposite second end plate of the fuel cell stack. Thereby, the tensioning element may have a first end fixed to a first end plate of the fuel cell stack and also has a second end fixed to a second end plate of the fuel cell stack. The stack may be compressed by a plurality of such tensioning elements.

The tensioning element may be formed as a band-shaped or strip-shaped flexible and/or elastic tensioning element. Thus, the tensioning element has an extension (width) in a first direction transverse to the tensioning direction, which is greater than an extension (height) in a second direction transverse to the first direction and transverse to the tensioning direction. The transverse vibrations may be excited along the second direction. The tensioning element may consist of an elastic plastic, an elastic polymer (for example, nylon) or an elastic metal and, under standard conditions, has a modulus of elasticity >1 GPa or >5 GPa along the tensioning direction.

Furthermore, the tensioning element may be fixed to at least one stack end plate in a firmly bonded manner and/or by means of at least one tensioning device, in particular by means of at least one screw. In order to ensure the easy dismantling of the fuel cell stack, the tensioning element may be detachably fixed to at least one end plate of the stack. The tensioning element may be hooked onto the end plate. For this purpose, the end plate may have at least one suspension hook for suspending the tensioning element on one of its side surfaces or on its surface facing outwards in the stacking direction. The tensioning element may also have at least one suspension opening for being suspended on a suspension hook.

In one embodiment, the at least one tensioning element extends in a cross-section in the stacking direction at least essentially around a circumference of the fuel cell stack. Thereby, a tensioning element is fixed at at least one of its end areas to another end area of the same tensioning element or to another tensioning element. Thus, the tensioning element can be formed to be closed in a ring shape. The tensioning element formed in a ring shape or a set of tensioning elements connected in a ring shape may have two vibratable sections, each extending along opposite sides of the fuel cell stack.

The end area of at least one tensioning element may be connected in a positive-locking manner to another end area of the same tensioning element, for example, by a crimp connection. Likewise, one end area of the at least one tensioning element may be fixed to another end area of the same or another tensioning element by means of a fastening device. The fastening device may comprise a fastening means, for example, a fastening screw and/or a fastening strip in which the fastening means engages. Likewise, the fastening device may further comprise at least one spring element that clamps one end area of the at least one tensioning element against another end area of the same or another tensioning element.

In one embodiment, the fuel cell stack has a plurality of tensioning elements clamped between the end plates in the stack direction. In the method, the above steps (a) to (d) are then carried out for each vibratable section of each tensioning element of the fuel cell stack. Finally, the compressive tensile force acting on the fuel cell stack is determined cumulatively as the sum of the tensile force determined for each vibratable section. Likewise, the compressive tensile force thus determined acting on the fuel cell stack can also be compared with a target compressive tensile force for the fuel cell stack.

Alternatively or additionally, a tensile force distribution acting on the fuel cell stack can be determined on the basis of the tensile force determined for each vibratable section. Likewise, the tensile force distribution determined in this manner can be compared with a target tensile force distribution. The determined and/or the target tensile force distribution may be a constant tensile force distribution, wherein the sections capable of being tensioned along the fuel cell stack exert approximately equal tensile forces on the fuel cell stack. Alternatively, the determined and/or target tensile force distribution is a tensile force distribution in which the sections capable of being tensioned along the fuel cell stack exert approximately equal tensile forces on the fuel cell stack. For example, a tensile force can increase or decrease in a direction transverse to the stacking direction.

Some embodiments also include a computer program which, after being loaded into a memory means of the data processing device, enables the data processing device to carry out a method for determining the compressive tensile force acting on a fuel cell stack as described above. The computer program may be configured to prompt a user to enter the number of vibratable sections of the tensioning elements compressing a fuel cell stack and, for each vibratable section, to enter its length and its linear mass distribution. The computer program is also configured to control a microphone to record an acoustic signal for each vibratable section and/or to load a corresponding data record for each vibratable section.

Some embodiments also include a data processing device with a storage medium on which a program is stored, which enables the data processing device to carry out a method for determining the compressive tensile force acting on a fuel cell stack as described above. The data processing device may have input means and/or an interface via which the number of vibratable sections of the tensioning elements compressing a fuel cell stack and, for each vibratable section, its length and its linear mass distribution can be fed into the program. In addition, the data processing equipment may have a sound transducer, for example, a microphone, to record the acoustic signal for each vibratable section. Furthermore, the data processing device has a memory element for storing the aforementioned input or fed-in data along with at least one processor for calculating the tensile forces acting on the vibratable sections in each case.

In some embodiments, the data processing device is a smartphone on which an application is stored, which enables the smartphone to carry out the methods described herein. In some embodiments, the data processing device is a control unit of a fuel cell system, wherein the fuel cell system further comprises means for exciting a vibration in each vibratable section of each tensioning element of a fuel cell stack along with means for receiving an acoustic signal from each vibratable section of each tensioning element of the fuel cell stack. The control unit also has a memory in which the values for the lengths and the linear mass densities of each of the vibratable sections are stored. Thus, the control unit in combination with the correspondingly formed fuel cell system is configured to carry out the methods described herein automatically at regular intervals. The control unit is also formed to issue a control signal or a warning signal if the determined compressive tensile force of the fuel cell stack falls below a predetermined limit value. This can be used, for example, to signal to the user of an electric vehicle that there is a problem with the tightness of the fuel cell stack and/or that a specialist workshop should be consulted.

Some embodiments also include the use of a smartphone to carry out a method for determining the compressive tensile force acting on a fuel cell stack as described above. Thereby, all or only some of the steps of the methods described herein can be carried out on a smartphone. In particular, it is sufficient if the acoustic signal for each vibratable section is detected by means of the smartphone, and the fundamental frequency may also be determined from this. The calculation of the tensile force acting on the vibratable section, including length and linear mass distribution, does not have to be done on the smartphone.

Aspects and features of the various embodiments described herein may be combined with each other unless stated otherwise in individual cases.

BRIEF DESCRIPTION OF THE SEVERAL VIEWS OF THE DRAWINGS

Embodiments of the invention are explained below in reference to the respective drawings. The following is shown.

DETAILED DESCRIPTION

Figure 1:
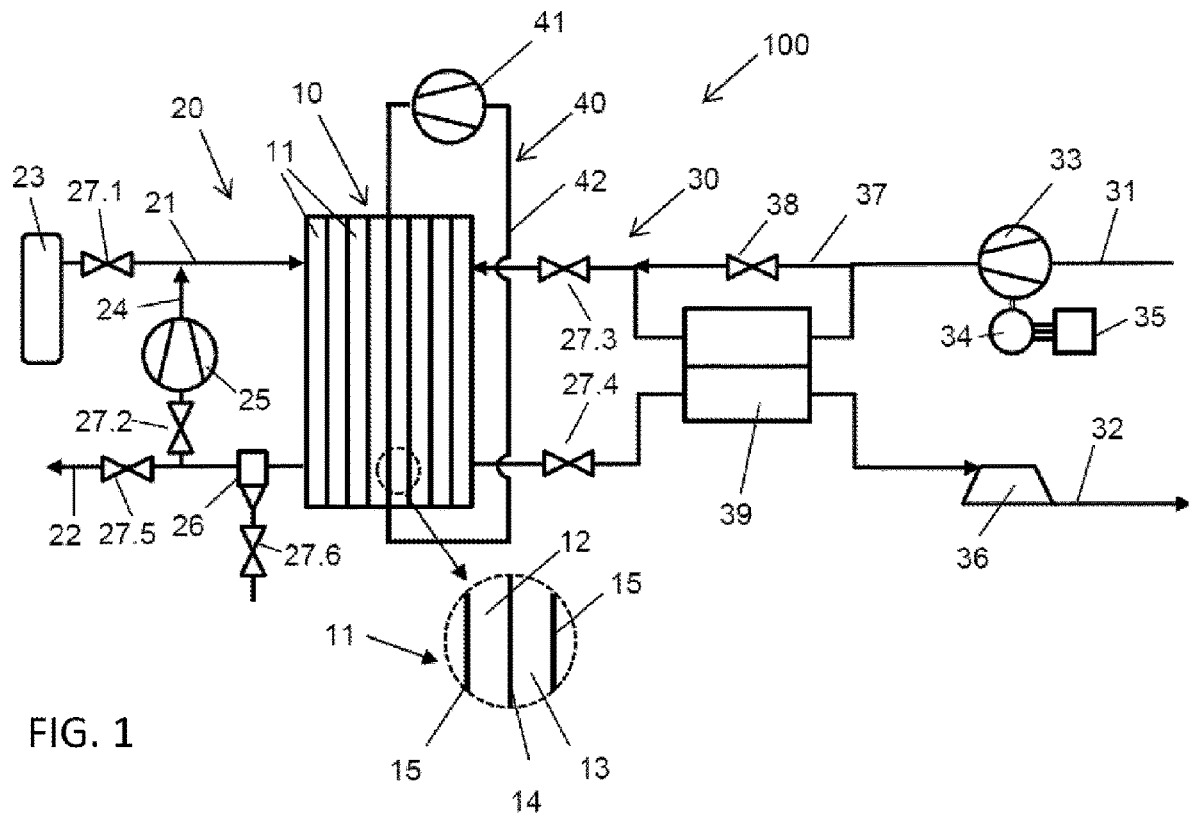
FIG. 1 is a schematic representation of a fuel cell system according to the prior art.

FIG. 1 shows a fuel cell system designated in total with 100, in accordance with the prior art. The fuel cell system 100 is part of a vehicle (not shown), in particular an electric vehicle, which has an electric traction motor, which is supplied with electrical energy by the fuel cell system 100.

The fuel cell system 100 comprises as core component a fuel cell stack 10, which comprises a plurality of individual cells 11, which are arranged in the form of a stack and which are formed by alternately stacked membrane electrode assemblies (MEAS) 14 and bipolar plates 15 (see detailed view). Each individual cell 11 thus respectively comprises an MEA 14 with an ion-conductive polymer electrolyte membrane not shown in more detail here and catalytic electrodes arranged thereon on both sides. These electrodes catalyze the respective partial reaction of the fuel conversion. The anode and cathode electrodes are designed as coating on the membrane and comprise a catalytic material, such as platinum, which is provided on an electrically conductive substrate material, with a large specific surface, such as a carbon-based material.

As shown in the detailed view of FIG. 1, an anode chamber 12 is formed between a bipolar plate 15 and the anode and the cathode chamber 13 is formed between the cathode and the next bipolar plate 15. The bipolar plates 15 serve to supply the operating media in the anode and cathode chambers 12, 13 and further establishes the electrical connection between the individual fuel cells 11. Optionally, gas diffusion layers can be arranged between the membrane electrode assemblies 14 and the bipolar plates 15.

In order to supply the fuel cell stack 10 with the operating medium, the fuel cell system 100 has an anode supply 20, on the one hand, and a cathode supply 30, on the other hand.

The anode supply 20 of the fuel cell system 100 shown in FIG. 1 comprises an anode supply path 21, which serves to supply an anode operating medium (the fuel), for example, hydrogen, to the anode chambers 12 of the fuel cell stack 10. For this purpose, the anode supply path 21 connects a fuel storage tank 23 with an anode inlet of the fuel cell stack 10. The feed pressure of the anode operating medium into the anode chambers 12 of the fuel cell stack 10 is adjusted via a metering valve 27.1. The anode supply 20 also comprises an anode exhaust path 22 which discharges the anode exhaust gas from the anode chambers 12 via an anode outlet of the fuel cell stack 10.

In addition, the anode supply 20 of the fuel cell system 100 shown in FIG. 1 has a recirculation line 24, which connects the anode exhaust gas path 22 with the anode supply path 21. The recirculation of fuel is a common practice in order to return the overstoichiometrically used fuel to the fuel cell stack 10. A recirculation conveying device 25, such as a recirculation fan, along with a flap valve 27.2 are arranged in the recirculation line 24.

In addition, a water separator 26 is installed in the anode supply 22 of the fuel cell system, in order to discharge the product water resulting from the fuel cell reaction. A drain of the water separator can be connected to the cathode exhaust line 32, a water tank or an exhaust system.

The cathode supply 30 of the fuel cell system 100 shown in FIG. 1 comprises a cathode supply path 31, which supplies an oxygen-containing cathode operating medium, in particular air taken in from the environment, to the cathode chambers 13 of the fuel cell stack 10. The cathode supply 30 also comprises a cathode exhaust path 32, which discharges the cathode exhaust gas (in particular the exhaust air) from the cathode chambers 13 of the fuel cell stack 10 and supplies it, if appropriate, to an exhaust system (not shown).

For conveying and compacting the cathode operating medium, a compressor 33 is arranged in the cathode supply path 31. In the embodiment shown, the compressor 33 is designed as a compressor 33, which is mainly driven by an electric motor 34 equipped with appropriate power electronics 35.

The fuel cell system 100 shown in FIG. 1 also has a humidifier module 39 arranged upstream of the compressor 33 in the cathode supply line 31. The humidifier module 39 is arranged in the cathode supply path 31 so that, on the one hand, the cathode operating gas can flow through it. On the other hand, it is arranged in the cathode exhaust path 32 such that the cathode exhaust gas can flow through it. A humidifier 39 typically comprises a plurality of water vapor permeable membranes, which are designed to be either flat or in the form of hollow fibers. In this case, the comparatively dry cathode operating gas (air) flows over one side of the membranes and the comparatively moist cathode exhaust gas (exhaust gas) flows over the other side. Driven by the higher partial pressure of water vapor in the cathode exhaust gas, water vapor is transferred across the membranes into the cathode operating gas, which is humidified in this manner.

The fuel cell system 100 also has a humidifier bypass 37 connecting the cathode supply line upstream and downstream of the humidifier 39 to each other, with a flap valve arranged therein as bypass control means 38. Furthermore, flap valves 27.3 and 27.4 are arranged upstream of fuel cell stack 10 in the anode supply line 21 and downstream of the fuel cell stack 10 in the anode exhaust line 22.

Various other details of anode and cathode supply 20, 30 are not shown in FIG. 1 for reasons of clarity. For example, the anode exhaust line 22 can open into the cathode exhaust line 32, such that the anode exhaust and the cathode exhaust are discharged via a common exhaust system.

Figure 2:
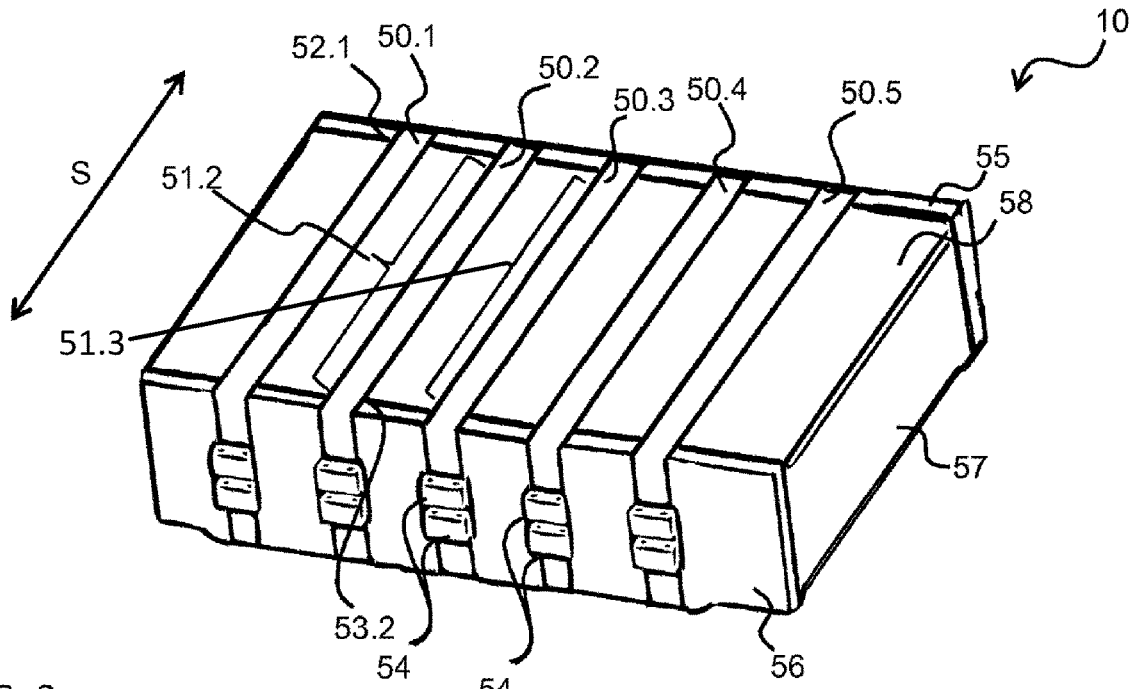
FIG. 2 is a fuel cell stack with a plurality of tensioning elements compressing the stack.

FIG. 2 shows a detailed representation of the fuel cell stack 10 shown in FIG. 1. The fuel cell stack has a plurality of fuel cells stacked flat on top of each other in stack direction S. In the stacking direction, the fuel cell stack 10 is bounded by a first end plate 55 and an opposite second end plate 56. In a first direction transverse to stack direction S, the fuel cell stack 10 is bounded by side panels 57. In a second direction transverse to the first direction and transverse to stack direction S, the fuel cell stack 10 is bounded by side panels 58. The fuel cell stack 10 can further comprise a plurality of mounting elements for fastening the fuel cell stack 10 to a supporting structure, for example, a car body.

The fuel cell stack 10 shown in FIG. 2 is compressed over a plurality of a total of ten tensioning elements 50. Thereby, each tensioning element 50 is fixed to the first end plate 55 via a tensioning device (not shown) and to the second end plate via an additional tensioning device 54 and runs parallel to a side panel 58 of the fuel cell stack 10. Thereby, each of the tensioning elements 50 has a spacing to the side panel 58. FIG. 2 shows in detail five tensioning elements 50.1, 50.2, 50.3, 50.4 and 50.5, which run parallel to an upper side panel 58. In addition, the fuel cell stack has five additional tensioning elements 50.6, 50.7, 50.8, 50.9 and 50.0 (not shown), which run parallel to a lower side panel and of which only the tensioning devices 54 fixed to the second end plate 56 are shown in FIG. 2. The tensioning elements 50 are made of nylon and have a linear mass distribution μ of 0.152 kg/m.

Each of the tensioning devices 54 is arranged on surfaces of the first end plate 55 facing outwards in stacking direction S and the second end plate 56. Thus, the tensioning elements 50 fixed to the tensioning devices 54 initially run along these surfaces, against which they abut, over an edge of the end plates 55, 56 and a narrow side surface of the end plates 55, 56. The end plates 55, 56 protrude approximately 2 mm beyond the side panels 58 in the second direction.

As a result, each tensioning element 50 has a first fixed end 52 at an inner edge of the first end plate 55 and a second fixed end 53 at an inner edge of the second end plate 56. FIG. 2 shows an example of the first fixed end 52.1 of a first tensioning element 50.1 and the second fixed end 53.2 of a second tensioning element 50.2. Each tensioning element 50 has a vibratable section 51 between its first fixed end 52 and its second fixed end 53. FIG. 2 shows an example of the vibratable section 51.2 of a second tensioning element 50.2 and the vibratable section 51.3 of a third tensioning element 50.3. Each of these vibratable sections 51 has a length of 383 mm.

In some embodiments, each vibratable section 51 of each tensioning element 50 is deflected manually in the second direction one after the other and thus excited to a transverse vibration. Since the end plates 55, 56 protrude approximately 2 mm beyond the side panels 58 in the second direction, the vibratable sections 51 of the clamped tensioning elements 50 are not in contact with the side panels 58 and can vibrate freely between the fixed ends 52, 53 with amplitudes of up to 2 mm.

For each vibrating vibratable section 51, an acoustic signal is initially detected, for example, by means of the microphone of a smartphone. In a next step, a frequency spectrum is determined for each of the recorded acoustic signals by means of a suitable program and from this, or directly for each recorded acoustic signal, a fundamental frequency of the recorded acoustic signal is determined. Programs for determining the frequency spectrum and/or the fundamental frequency are freely available on the market.

The following table shows for each vibratable section of each of the ten tensioning elements 50 the fundamental frequencies $f_1$ determined in accordance with the description herein and furthermore the tensile force $F_{zug}$ acting on the respective vibratable section 51, which was determined from the frequency $f_1$ of the respective vibratable section 51 according to the formula mentioned in the description:

|  | 50.1 | 50.2 | 50.3 | 50.4 | 50.5 | 50.6 | 50.7 | 50.8 | 50.9 | 50.0 |
|---|---|---|---|---|---|---|---|---|---|---|
| $f_1$ [Hz] | 188 | 167 | 173 | 179 | 173 | 173 | 170 | 170 | 179 | 182 |
| $F_{zug}$ [kN] | 3.1 | 2.5 | 2.7 | 2.9 | 2.7 | 2.7 | 2.6 | 2.6 | 2.9 | 2.9 |

Under the assumption that the fuel cell stack 10 as a whole is in equilibrium of forces, the sum of the tensile forces determined for all vibratable sections 51 corresponds to the total compressive tensile force of 27.6 kN acting on the fuel cell stack 10.

The fuel cell stack 10 was originally compressed with a defined pressure force of 28.5 kN and was fixed in the compressed form by means of tensioning elements 50. The method described herein thus produces results of the right order of magnitude and also indicates a decreasing compression of the fuel cell stack 10.

Figure 3:
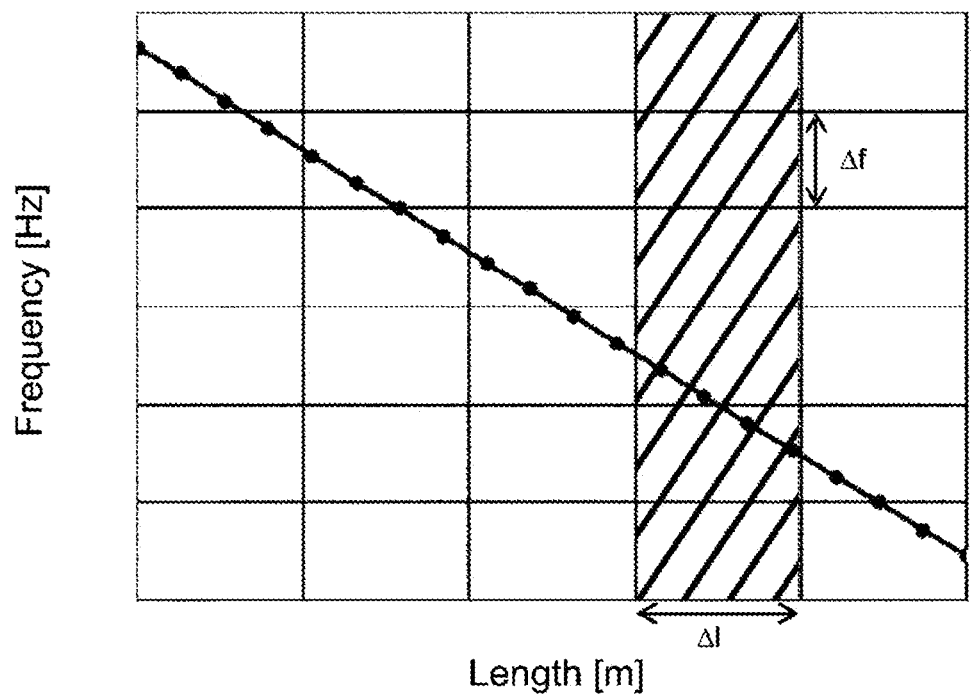
FIG. 3 illustrates the dependence of the fundamental frequency of a tensioning element on its length.
Figure 4:
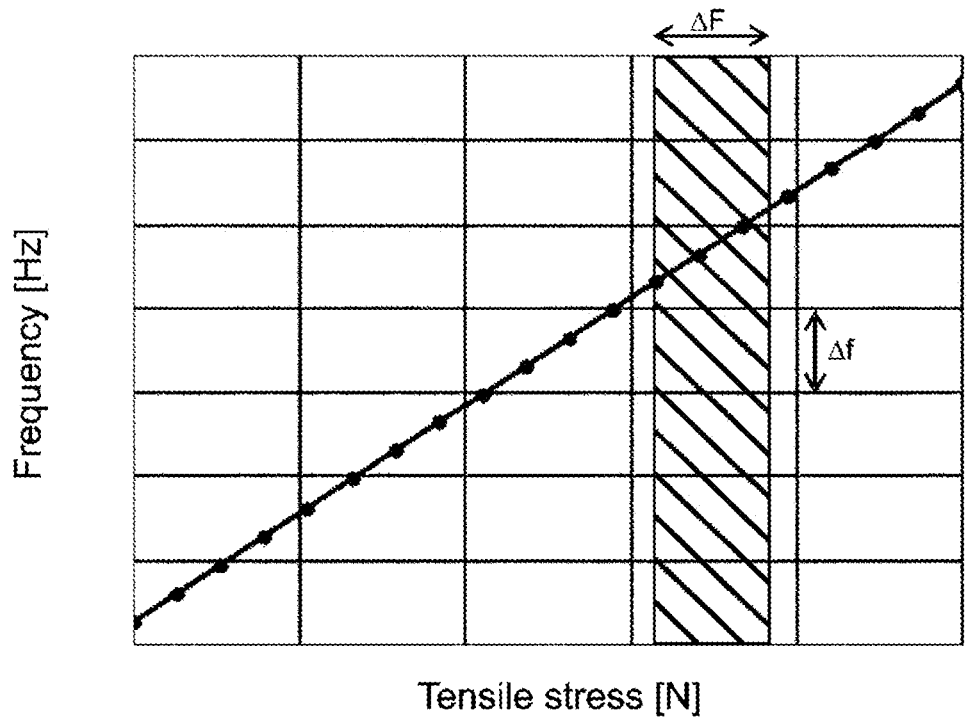
FIG. 4 illustrates the dependence of the fundamental frequency of a tensioning element on the tensile force acting on it.
Figure 5:
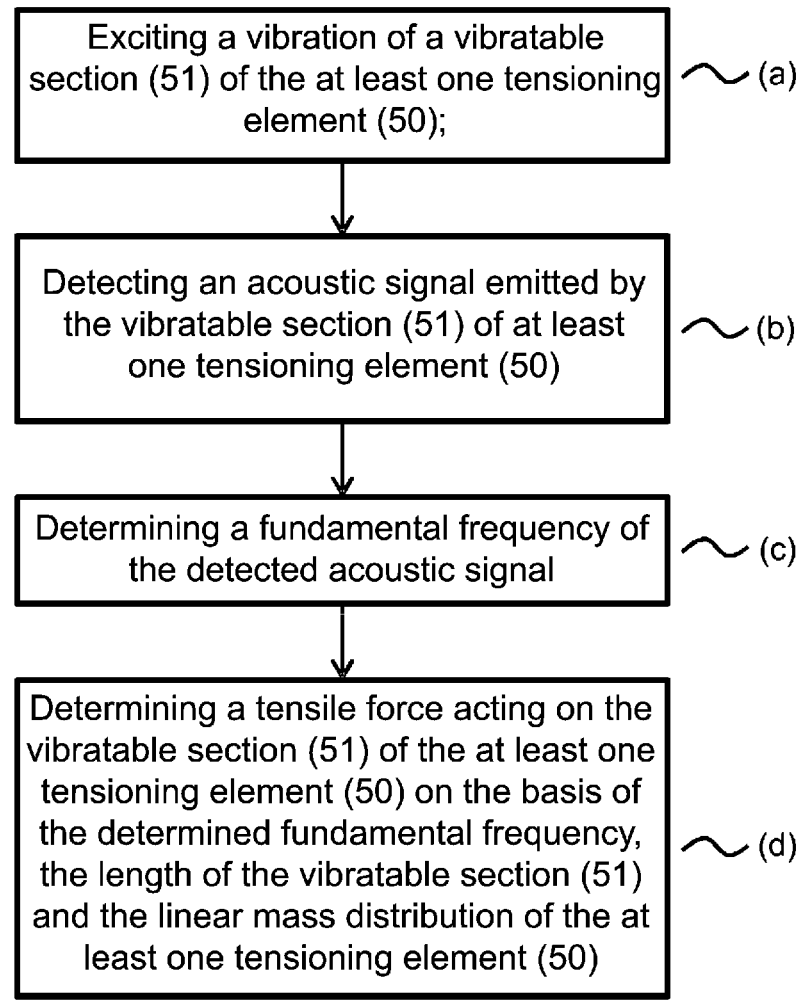
FIG. 5 is a flow chart of a method.

The length deviation Δl of approximately 1 mm shown in FIG. 3 corresponds to a change in the fundamental frequency Δf of approximately 0.5 Hz. Thus, the method described herein is relatively invariant with respect to smaller measuring errors of the lengths of the vibratable sections 51. The change of only 15 N in the tensile force ΔF acting on a vibratable section 51, shown in FIG. 4, corresponds to a change of its fundamental frequency Δf by 0.5 Hz as well. Thus, the method described herein is sufficiently accurate with respect to the measurement of force.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for determining a compressive tensile force acting on a fuel cell stack due to at least one tensioning element, wherein the fuel cell stack has a plurality of fuel cells arranged in a stacking direction between two end plates and at least one tensioning element clamped between the end plates in the stacking direction, the method comprising:
   exciting a vibration of a vibratable section of the at least one tensioning element;
   detecting an acoustic signal emitted from the vibratable section of the at least one tensioning element;
   determining a fundamental frequency of the detected acoustic signal; and
   determining a tensile force acting on the vibratable section of the at least one tensioning element on the basis of the determined fundamental frequency, the length of the vibratable section, and the linear mass distribution of the at least one tensioning element.

2. The method according to claim 1, wherein the vibratable section of the at least one tensioning element extends from a first end plate to an opposite second end plate of the fuel cell stack.

3. The method according to claim 1, wherein the at least one tensioning element extends in a cross-section in the stacking direction essentially around a circumference of the fuel cell stack and has two vibratable sections along opposite sides of the fuel cell stack.

4. The method according to claim 1, wherein the fuel cell stack has a plurality of tensioning elements clamped in the stacking direction between the end plates, the method further comprising:
   determining a tensile force acting on the vibratable section of each of the tensioning elements on the basis of a respective determined fundamental frequency, a respective length of the vibratable section, and a respective linear mass distribution of the tensioning element; and
   determining the compressive tensile force acting on the fuel cell stack as the sum of the tensile forces determined for each vibratable section or determining the compressive tensile force distribution acting on the fuel cell stack on the basis of the tensile forces determined for each vibratable section.

5. The method according to claim 1, wherein detecting an acoustic signal is carried out with a sound transducer.

6. The method according to claim 1, wherein the linear mass distribution of the at least one tensioning element is determined on the basis of the density of the at least one tensioning element and the cross-section of the at least one tensioning element.

7. A computer program which, after being loaded into a memory of a data processing device, enables the data processing device to carry out a method for determining a compressive tensile force acting on a fuel cell stack, the method comprising:
   exciting a vibration of a vibratable section of the at least one tensioning element;
   detecting an acoustic signal emitted from the vibratable section of the at least one tensioning element;
   determining a fundamental frequency of the detected acoustic signal; and
   determining a tensile force acting on the vibratable section of the at least one tensioning element on the basis of the determined fundamental frequency, the length of the vibratable section, and the linear mass distribution of the at least one tensioning element.

8. A data processing device comprising a storage medium on which a program is stored, which enables the data processing device to carry out a method for determining a compressive tensile force acting on a fuel cell stack, the method comprising:
   exciting a vibration of a vibratable section of the at least one tensioning element;
   detecting an acoustic signal emitted from the vibratable section of the at least one tensioning element;
   determining a fundamental frequency of the detected acoustic signal; and
   determining a tensile force acting on the vibratable section of the at least one tensioning element on the basis of the determined fundamental frequency, the length of the vibratable section, and the linear mass distribution of the at least one tensioning element.

9. The data processing device according to claim 8, wherein the data processing device is a smartphone.

10. The method of claim 1 wherein the detecting an acoustic signal is performed by a smartphone.

* * * * *